No. 622,919. Patented Apr. 11, 1899.
H. FITCHIE.
MILK STRAINER.
(Application filed Feb. 3, 1898.)
(No Model.)
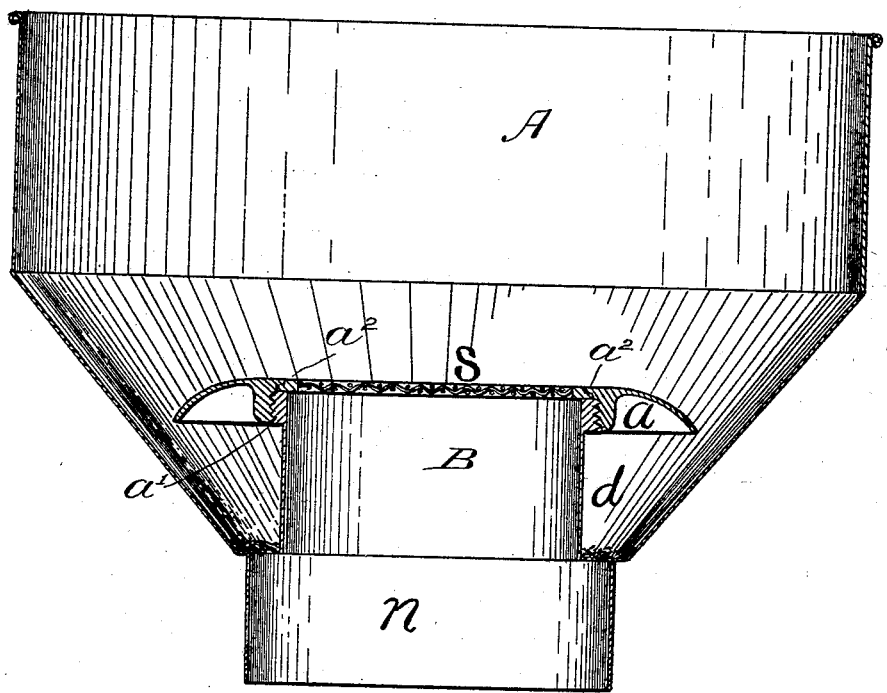
Witnesses
Chas. B. Stiles
Frank S. Hoseki
Inventor
Hugh Fitchie

UNITED STATES PATENT OFFICE.

HUGH FITCHIE, OF ELGIN, ILLINOIS.

MILK-STRAINER.

SPECIFICATION forming part of Letters Patent No. 622,919, dated April 11, 1899.

Application filed February 3, 1898. Serial No. 668,986. (No model.)

*To all whom it may concern:*

Be it known that I, HUGH FITCHIE, a citizen of the United States, residing at Elgin, in the county of Kane and State of Illinois, have invented certain new and useful Improvements in Milk-Strainers, of which the following is a specification.

The invention relates to that class of apparatus which is used for the purpose of straining milk before it is placed in the cans for shipment or storage, and has for its object the providing of a simple, economical, and efficient strainer.

The invention consists principally in the combination of a receptacle provided with a vertical tubular portion, a strainer at the top of the vertical tubular portion, and an annular imperforate deflecting-ring surrounding the strainer and providing, in combination with the strainer, a chamber to receive and hold the dirt or sediment cast off by the strainer.

The invention consists, further, in the combination, with a funnel which forms an inclosing receptacle, of an inner upwardly-extending tubular portion, a strainer removably secured to the upper end of the tubular portion, and an annular imperforate deflecting-ring surrounding the strainer and forming, in combination with the funnel, an annular chamber to receive sediment and the like.

The invention consists, further and finally, in the features, combinations, and details of construction hereinafter described and claimed.

In the accompanying drawing the figure represents a vertical sectional elevation of a strainer constructed in accordance with my improvements.

In constructing a strainer in accordance with my improvements I make an inclosing receptacle A of the desired size and shape and which is preferably made in the form of a funnel or hopper. This inclosing funnel-shaped receptacle is provided with a portion $n$, adapted to be inserted within an ordinary milk-can for the purpose of holding it in position for use. The receptacle is also provided with an upwardly and inwardly projecting tubular portion B, which when in use is arranged in a vertical line, and the top portion thereof is provided with a screen S, formed of wire mesh or reticulated material removably secured to the upper portion of the upwardly-extending tubular portion, so as to obstruct the passage thereof and form a strainer through which milk may pass, but which will hold back sediment and large impurities. To removably hold this screen in position, I provide an annular imperforate deflecting-ring $a$, which has threaded engagement at $a'$ with the vertical tubular portion and which has a shoulder $a^2$, engaging with the ring of the screen to hold it in position. This annular deflecting portion is preferably curved outwardly and downwardly on the upper surface and is of such diameter as to almost reach the inclined sides of the funnel and provide, in combination with the funnel and the vertical tubular portion, a chamber $d$, in which sediment and large impurities may be caught and retained during the process of straining.

The principal advantages incident to a strainer constructed in accordance with my improvement are, first, the screen being arranged at the upper part of the vertical tubular section prevents any sediment or large impurities from passing into a chamber from which it cannot be removed until it has been first separated from the milk or, in other words, removes it directly and as quickly as possible from the straining-channel, and, second, to keep all sediment out of the way of the milk following and prevent its return into such position.

I claim—

1. In an apparatus of the class described, the combination of an inclosing receptacle provided with an upwardly and inwardly extending tubular portion, a screen arranged on the upper part of the tubular portion, and an annular deflecting-ring surrounding the screen and forming in combination with the receptacle a chamber to receive sediment, substantially as described.

2. In an apparatus of the class described, the combination of a funnel-shaped inclosing receptacle provided with an upwardly and inwardly extending tubular portion, a screen arranged near the upper part of the tubular portion, and an annular imperforate deflecting-ring surrounding the screen and forming in combination with the funnel and tubular portion a chamber to receive sediment and the like, substantially as described.

3. In an apparatus of the class described, the combination of a funnel-shaped receptacle provided with an upwardly and inwardly extending tubular portion, a screen arranged at the upper part thereof, and an annular deflecting-ring removably secured to the tubular portion for surrounding and holding the screen removably in position and forming in combination with the funnel and tubular portions a chamber to receive sediment and the like, substantially as described.

4. In an apparatus of the class described, the combination of a funnel-shaped receptacle provided with an upwardly and inwardly extending tubular portion having a threaded upper portion, a screen removably secured to the upper part of the tubular portion, and an annular imperforate deflecting-ring having threaded engagement with the tubular portion surrounding and removably holding the screen in position and forming in combination with the funnel and tubular portions a chamber to receive sediment and the like, substantially as described.

HUGH FITCHIE.

Witnesses:
CHAS. B. STILES,
FRANK S. HEATH.